July 17, 1956 R. M. SHAW, JR 2,754,881
BENDING MACHINES
Filed Oct. 1, 1954 11 Sheets-Sheet 1
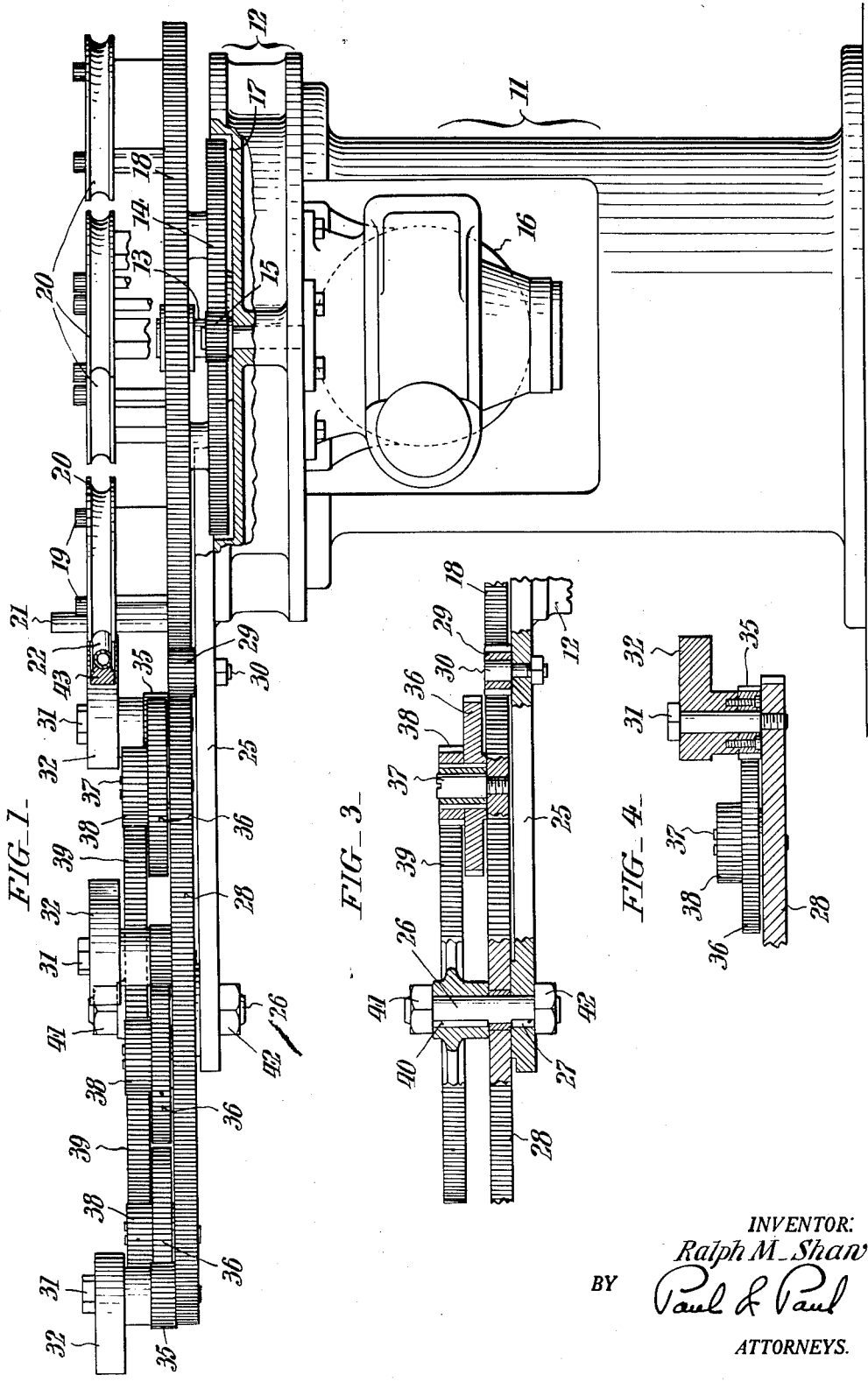
INVENTOR:
Ralph M. Shaw, Jr.,
BY Paul & Paul
ATTORNEYS.

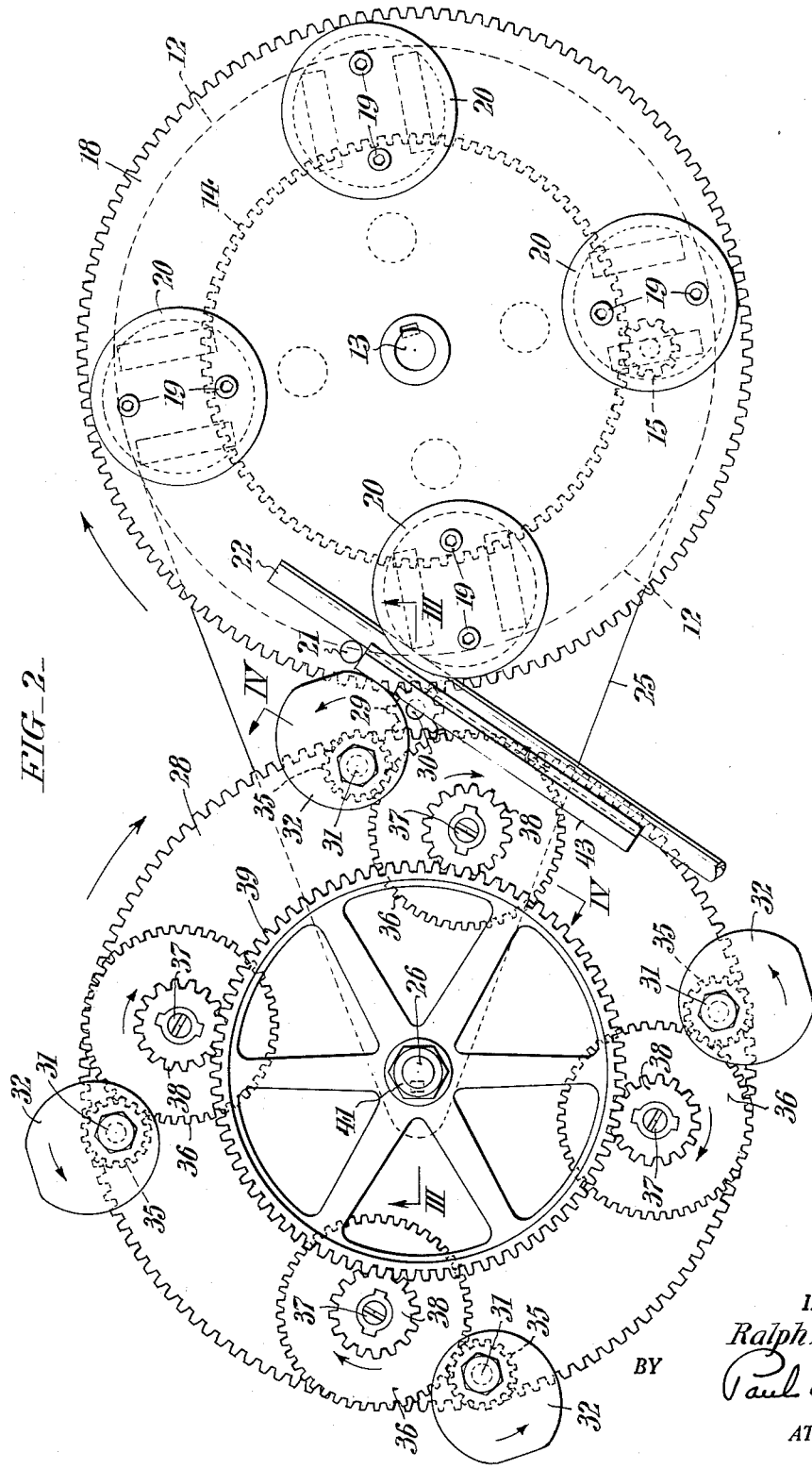

July 17, 1956  R. M. SHAW, JR  2,754,881
BENDING MACHINES
Filed Oct. 1, 1954  11 Sheets-Sheet 3
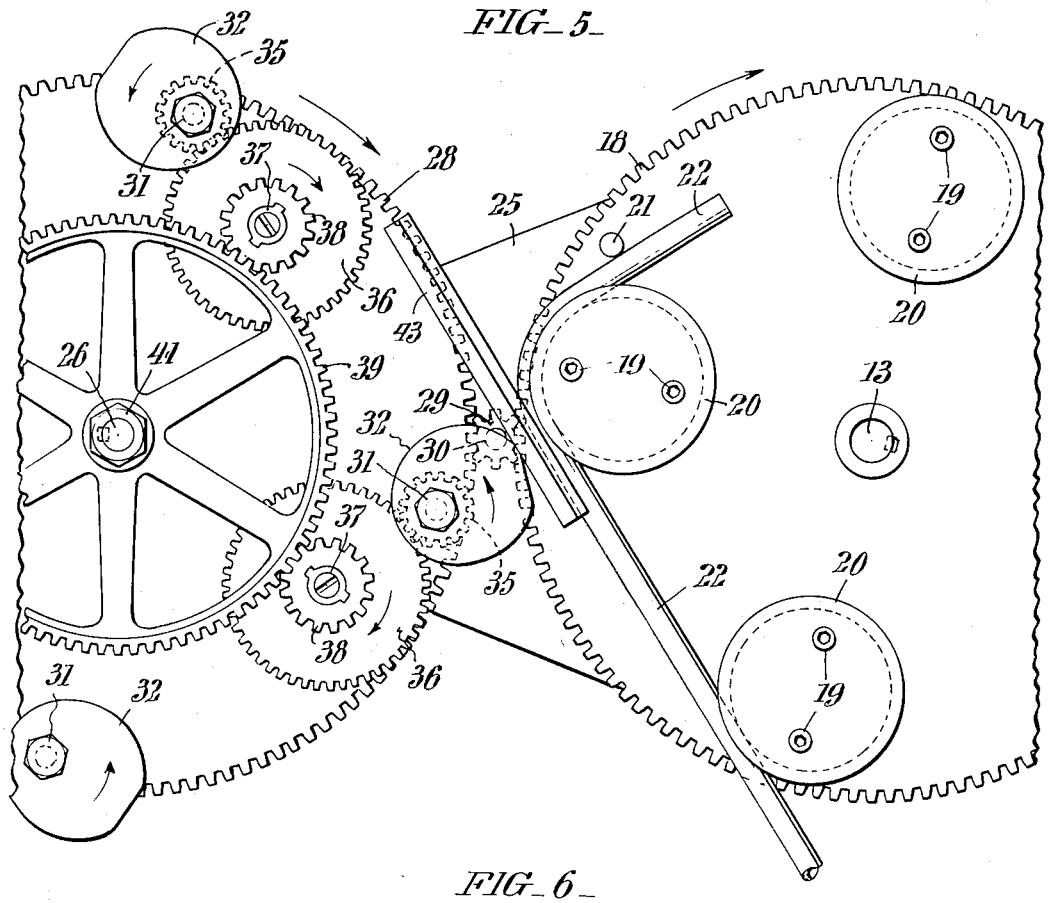
FIG_5_
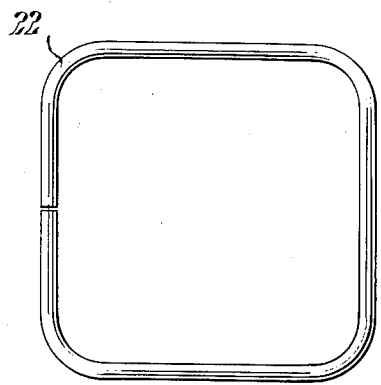
FIG_6_
INVENTOR:
Ralph M. Shaw, Jr.,
BY Paul & Paul
ATTORNEYS.

July 17, 1956  R. M. SHAW, JR  2,754,881
BENDING MACHINES
Filed Oct. 1, 1954  11 Sheets-Sheet 4
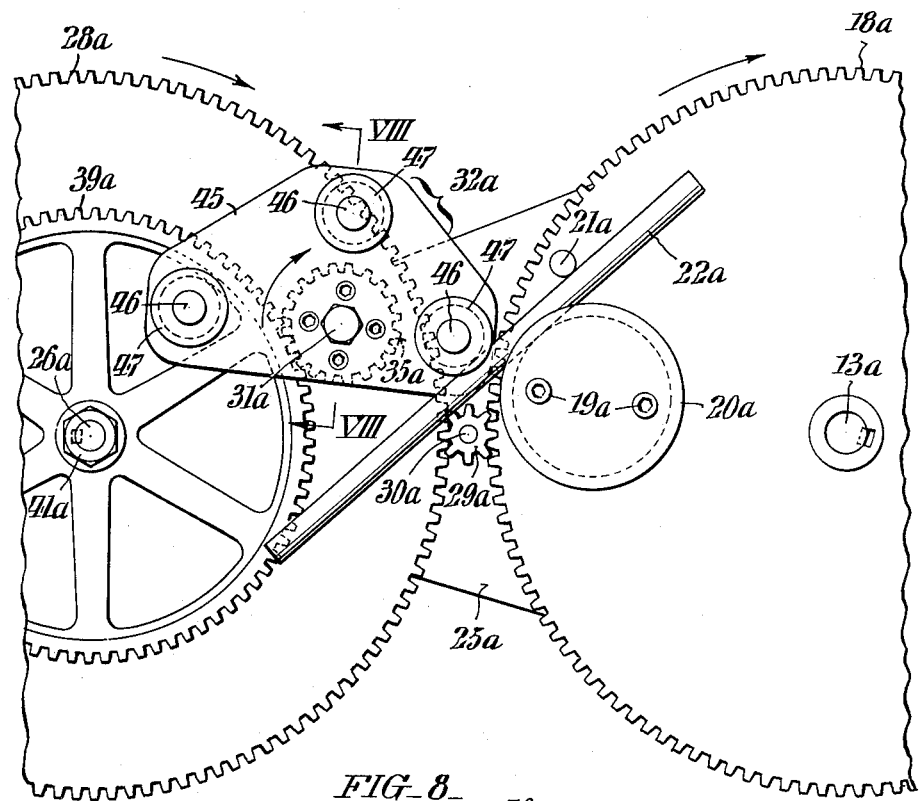
FIG_7_
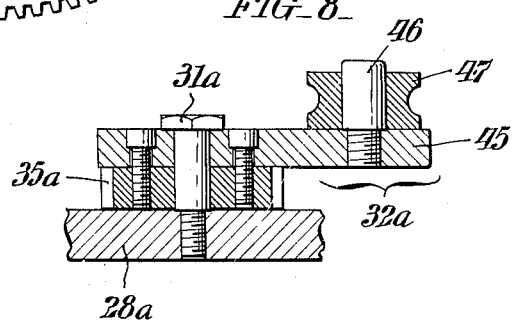
FIG_8_
INVENTOR:
*Ralph M. Shaw, Jr.*,
BY *Paul & Paul*
ATTORNEYS.

July 17, 1956
R. M. SHAW, JR
2,754,881
BENDING MACHINES
Filed Oct. 1, 1954
11 Sheets-Sheet 5
FIG_9_
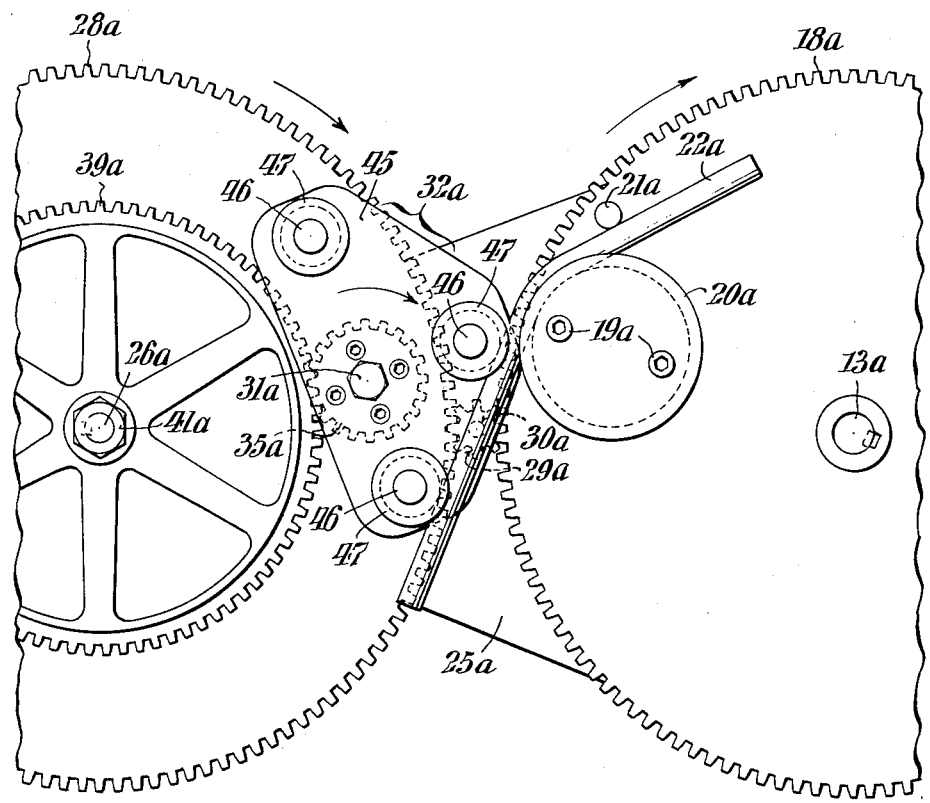
INVENTOR:
Ralph M. Shaw, Jr.,
BY Paul & Paul
ATTORNEYS.

July 17, 1956  R. M. SHAW, JR  2,754,881
BENDING MACHINES
Filed Oct. 1, 1954  11 Sheets-Sheet 6
FIG_10_
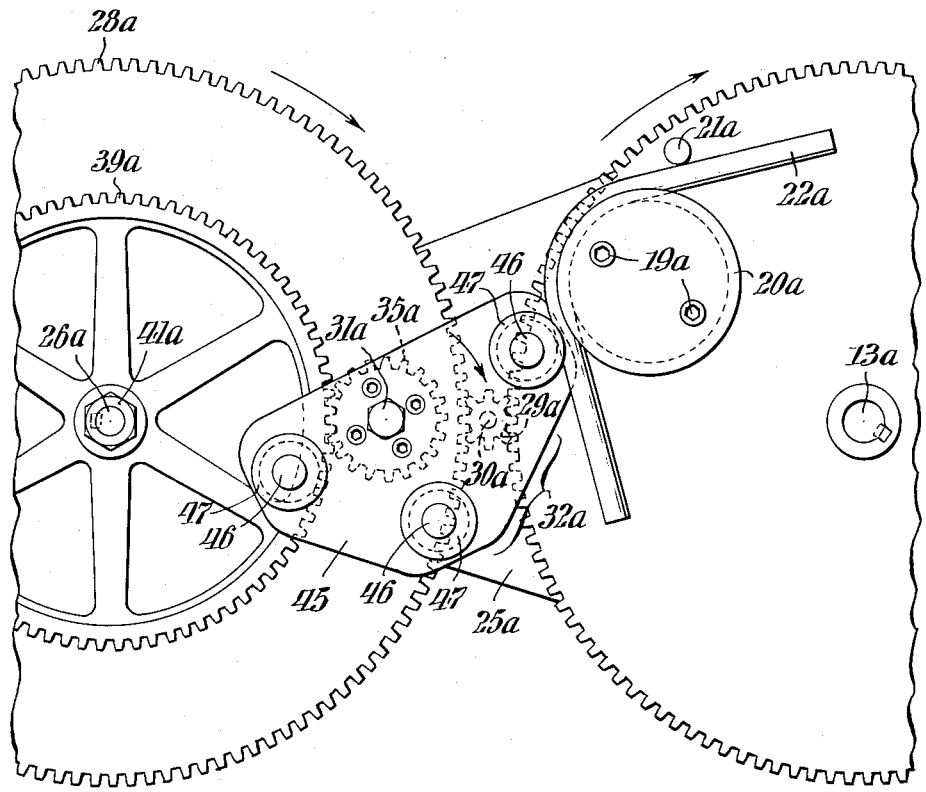
INVENTOR:
Ralph M. Shaw, Jr.,
BY
Paul & Paul
ATTORNEYS.

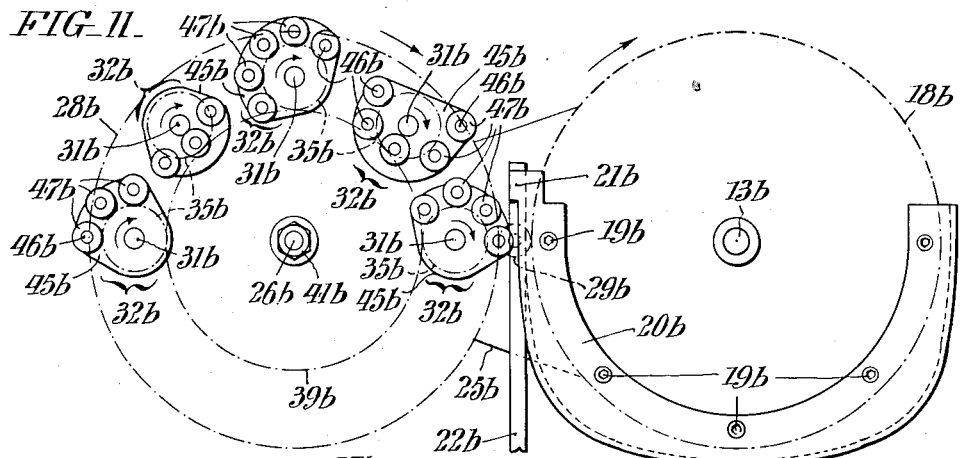
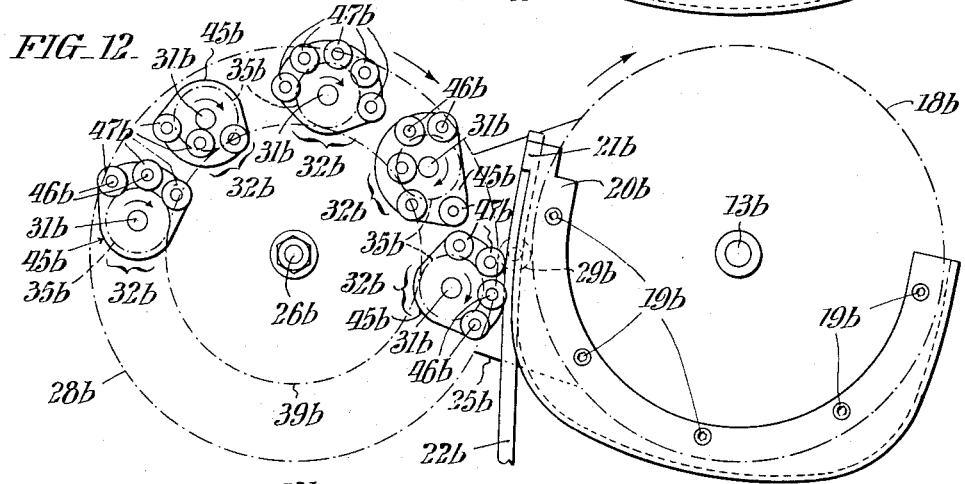
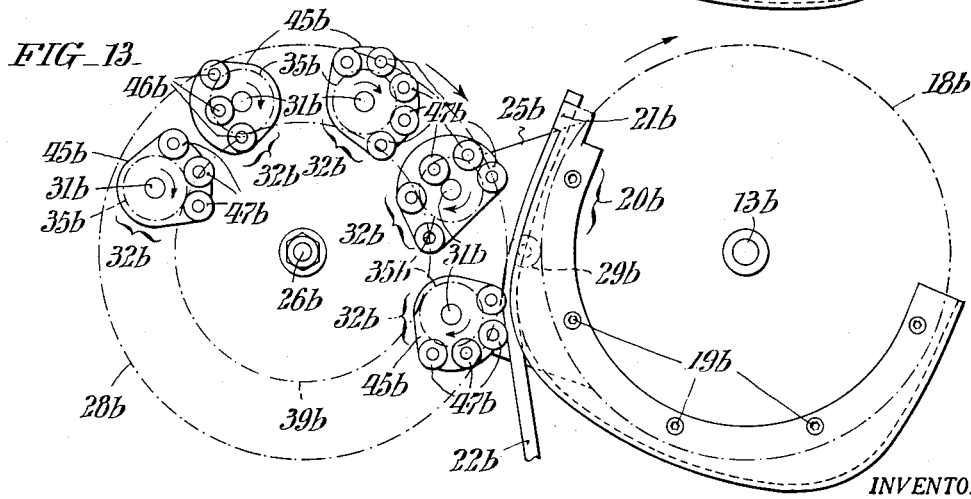

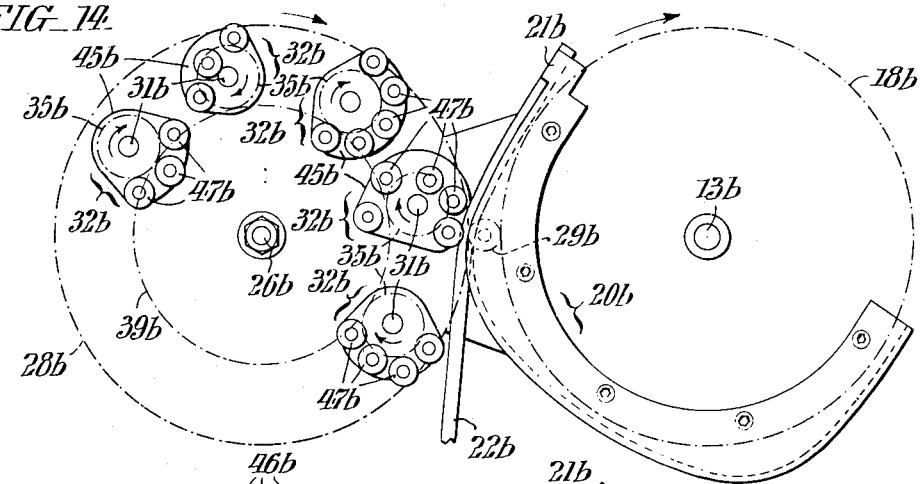
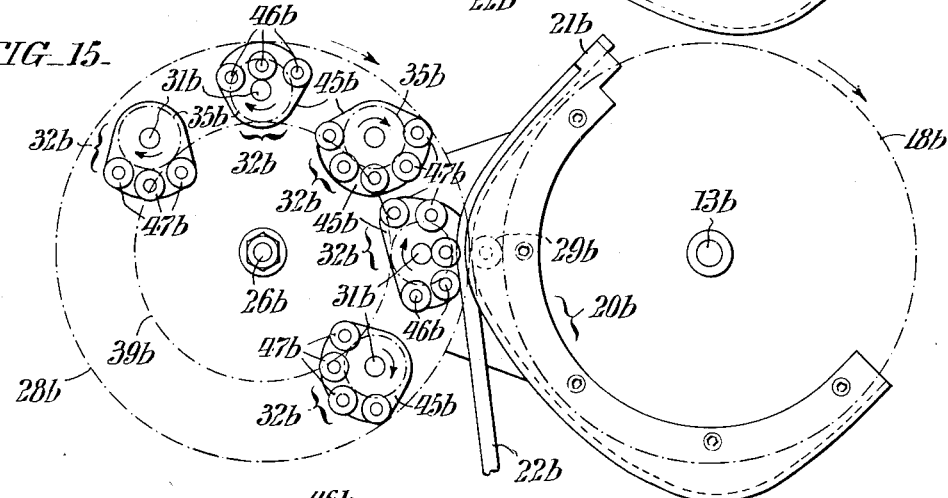
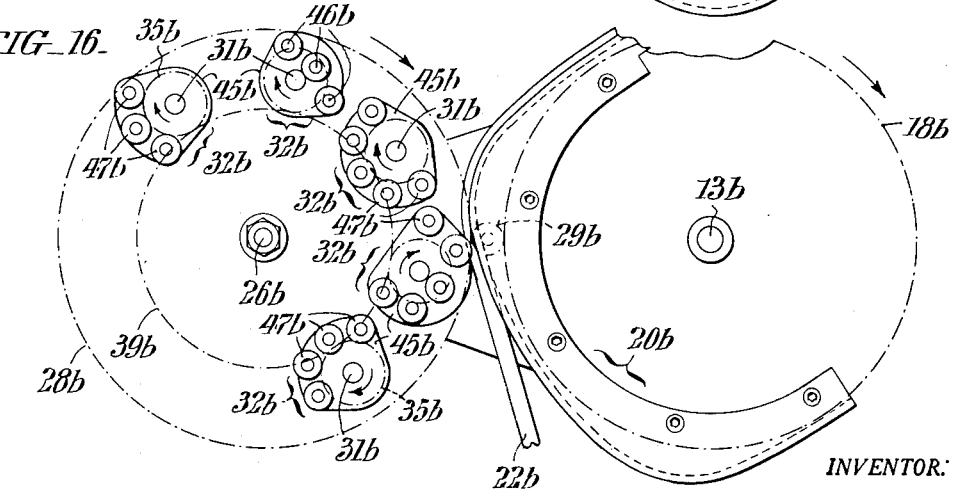

July 17, 1956 R. M. SHAW, JR 2,754,881
BENDING MACHINES
Filed Oct. 1, 1954 11 Sheets-Sheet 9
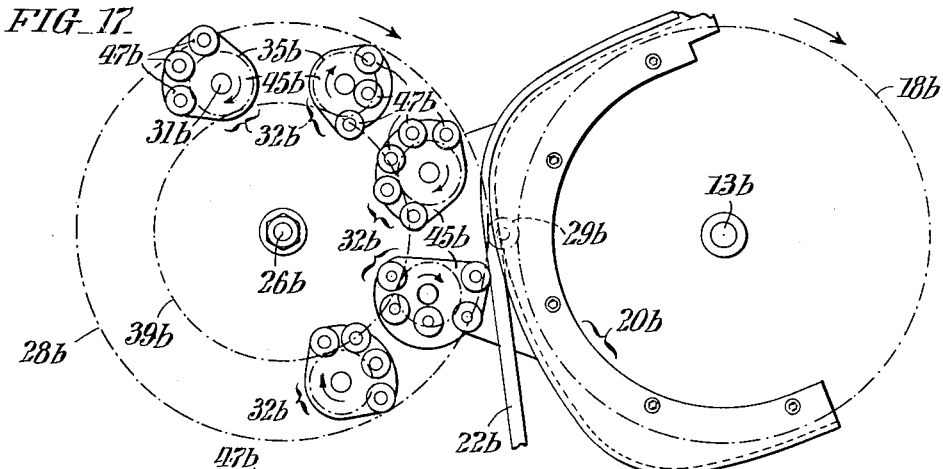
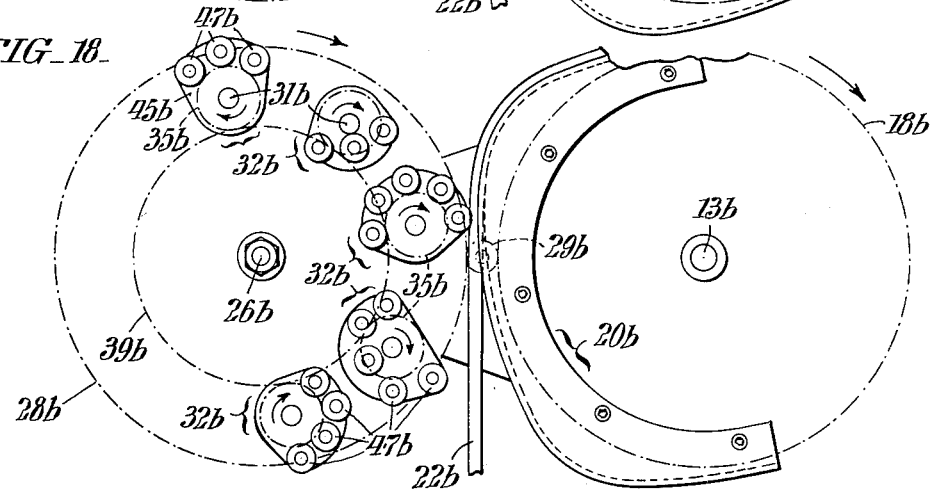
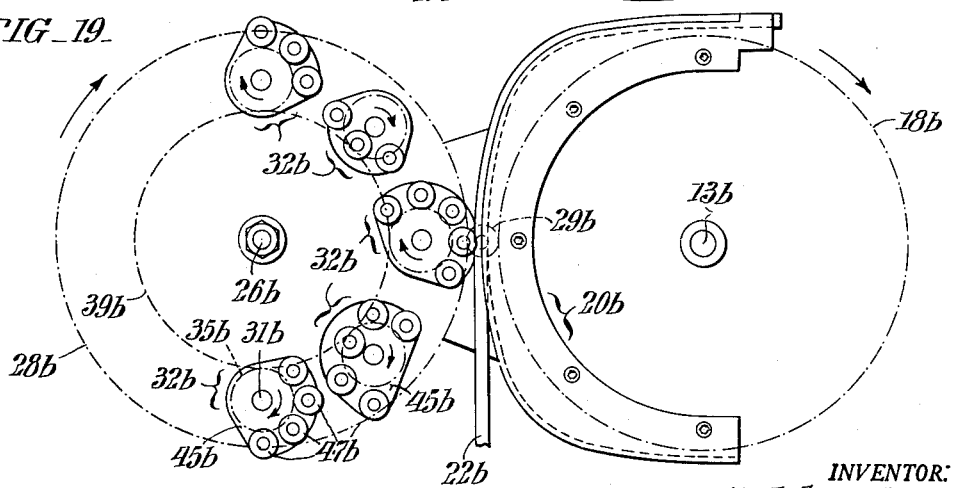
INVENTOR:
Ralph M. Shaw, Jr.,
BY Paul & Paul
ATTORNEYS.

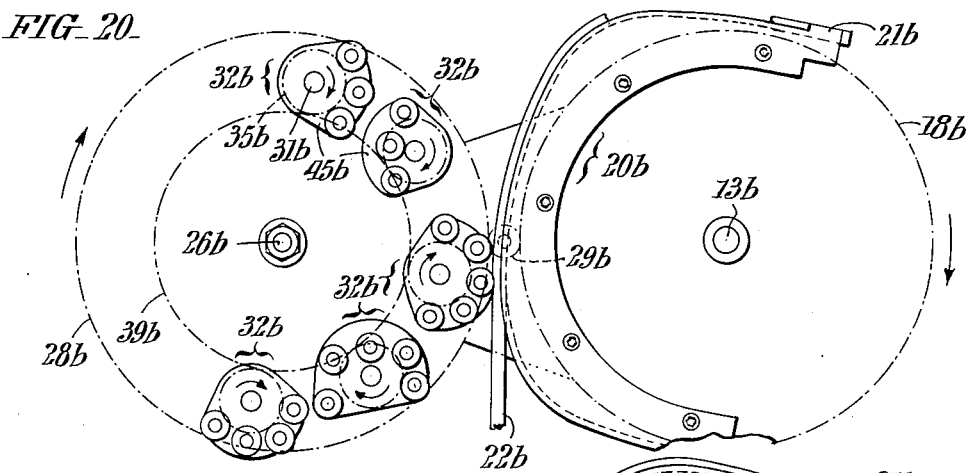
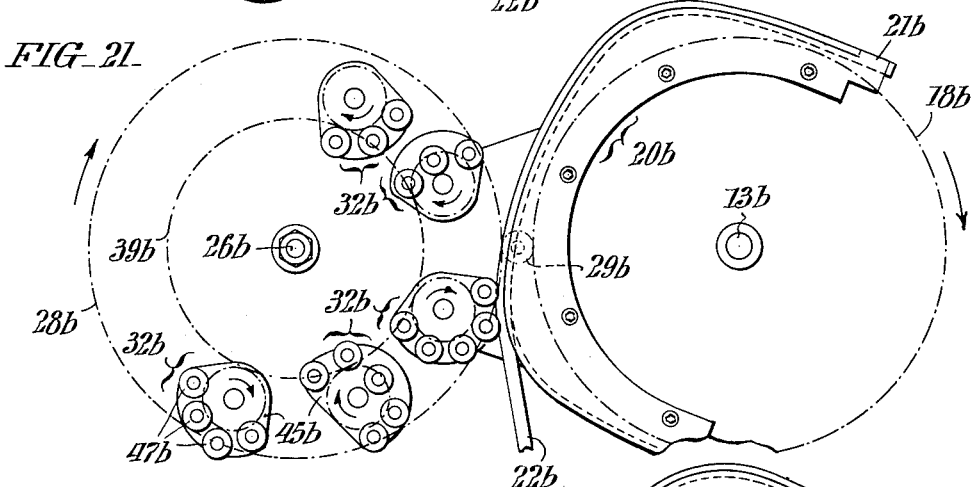
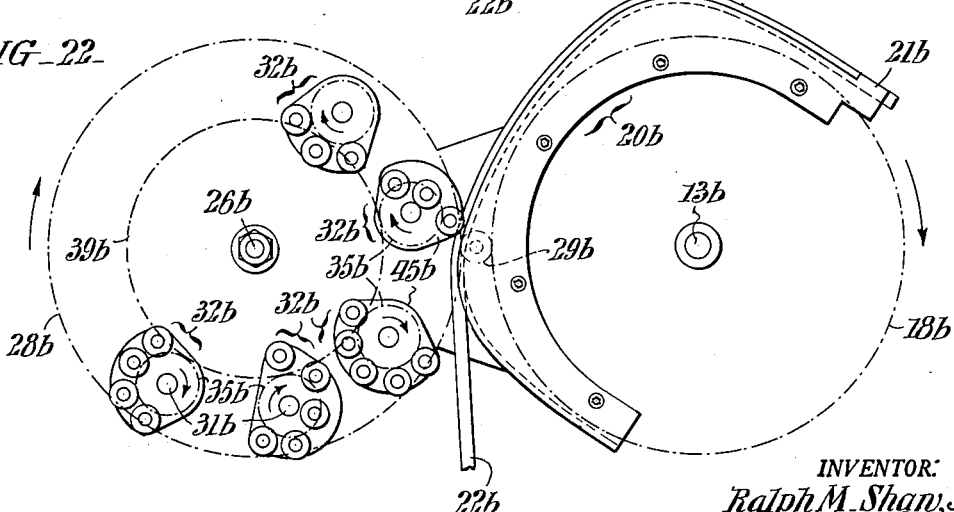

July 17, 1956  R. M. SHAW, JR  2,754,881
BENDING MACHINES
Filed Oct. 1, 1954  11 Sheets—Sheet 11
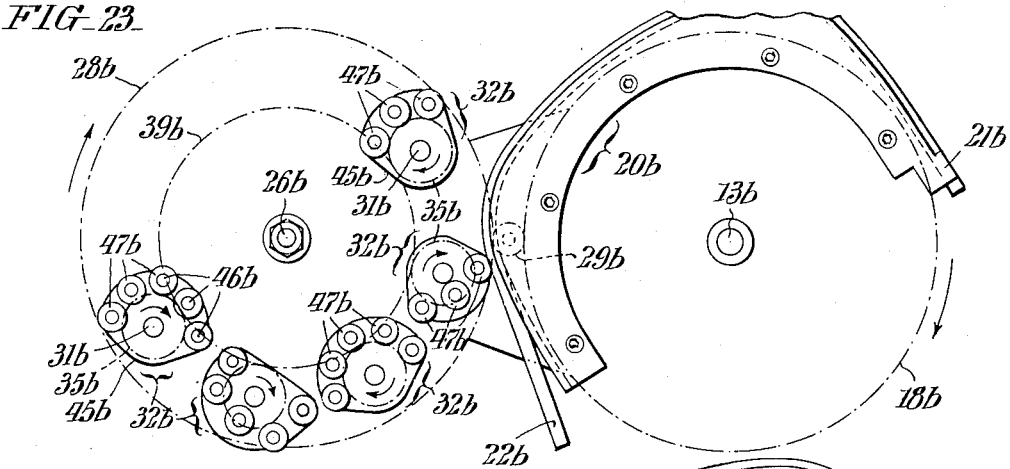
FIG_23.
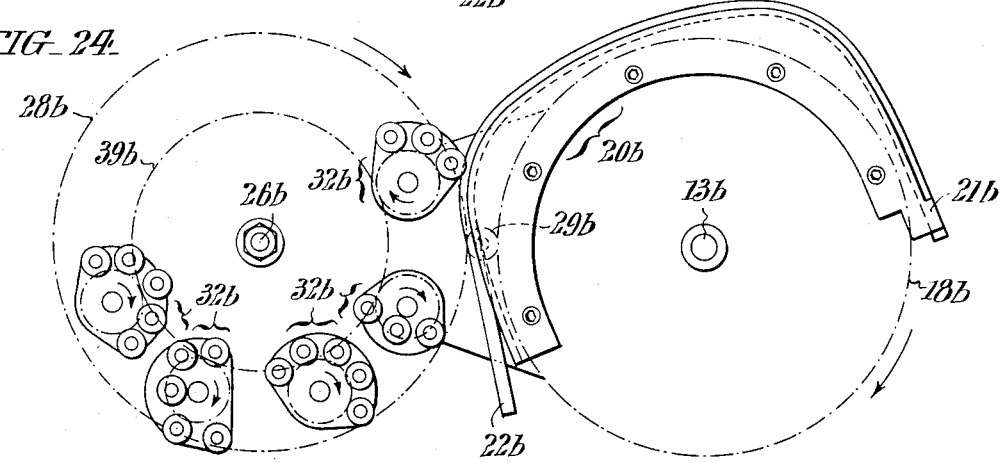
FIG_24.
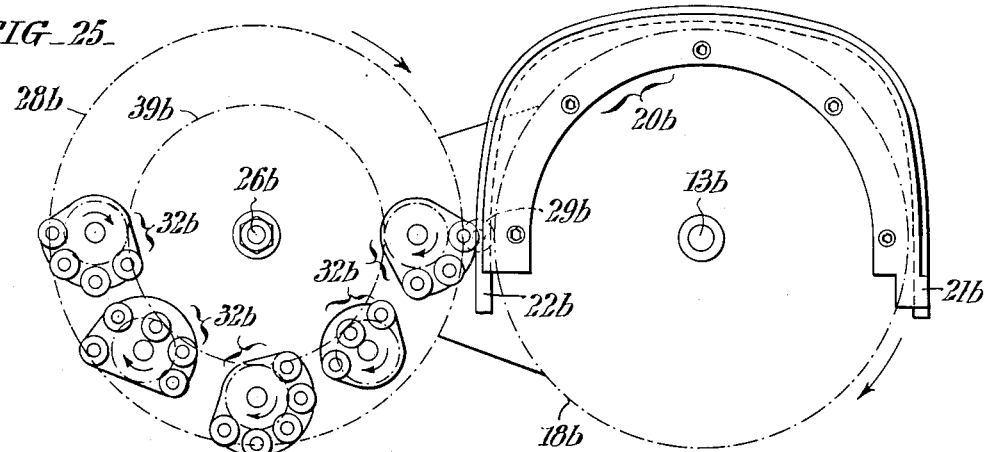
FIG_25.
INVENTOR:
Ralph M. Shaw, Jr.,
BY
Paul & Paul
ATTORNEYS.

United States Patent Office 2,754,881
Patented July 17, 1956

2,754,881

BENDING MACHINES

Ralph M. Shaw, Jr., Edgewater Park, N. J.

Application October 1, 1954, Serial No. 459,689

12 Claims. (Cl. 153—40)

This invention relates to bending machines. More particularly, it is concerned with power operated machines for bending work pieces such as bars, rods, tubes, plates, etc. to angular or other configurations.

My invention has for its chief aim, the provision of simple, rugged and reliable machine by which one or more bends of different shapes and curvatures can be made in work pieces of the kind above mentioned quickly and accurately with minimum consumption of power.

Other objects and the attendant advantages will appear from the following detailed description of the attached drawings, wherein:

Fig. 1 is a view in side elevation, with portions broken out and shown in section, of a bending machine conveniently embodying my invention in one form.

Fig. 2 shows the machine of Fig. 1 in top plan.

Figs. 3 and 4 are fragmentary detail sectional views taken as indicated respectively by angled arrows III—III and IV—IV in Fig. 2.

Fig. 5 is a fragmentary view in plan corresponding to Fig. 2, showing the manner in which a work piece is bent in the machine.

Fig. 6 shows a typical work piece after it has been bent in the machine.

Fig. 7 is a fragmentary view in top plan, like Fig. 2, of an alternative embodiment of my invention.

Fig. 8 is a fragmentary detail sectional view taken as indicated by the angled arrows VIII—VIII in Fig. 7.

Figs. 9 and 10 are views corresponding to Fig. 7 showing successive stages in the bending of a work piece in the alternative machine; and Figs. 11–25 are views, in turn generally like Fig. 2, showing still another embodiment of my invention.

With specific reference first to Figs. 1–5 of these illustrations, my improved bending machine, in the embodiment there depicted, comprises a hollow pedestal-like base 11. Mounted on the base 11 is a circular table 12 which, at the center, has a bearing (not shown) for a vertical axis shaft 13 whereto is affixed a spur gear wheel 14. Through an intermeshing spur pinion 15, the gear wheel 14 is driven at reduced speed from an electric motor 16 bolted to the bottom of the table 12 within a hollow of the pedestal 11, said gear wheel being depressed within a recess 17 in the top of said table. Secured to the shaft 13 above the gear wheel 14 is a flat plain surfaced support or disk 18 of larger diameter which is also in the form of a spur gear wheel. Secured to the top of the disk 18, by screws 19, are radially or eccentrically disposed die elements 20 which are suitably spaced circumferentially of the disk as shown in Fig. 2, there being in this instance, four of such elements, although their number may be increased or decreased depending upon the character of the bends to be made. It will be noted that the die elements 20 are circular in configuration and peripherally grooved for the bending of rods or tubes circular in cross section. For the bending of tubes or bars of other cross sectional configurations, the grooves of the die elements 20 will, of course, be shaped to correspond. Fixed in the disk 18 closely adjacent one of the die elements 20 is a stud projection 21 between which and said element one end portion of a rod or tube 22 to be bent is inserted.

Integrally formed with, or suitably secured to, the table 12 is a laterally extending bracket arm 25 wherein is engaged, at the distal end, a short shaft 26 which is held against rotation by a key 27. Free on the shaft 26 is a support 28 which, like the support 18, is discoid in configuration and in the form of a spur gear wheel, and which may or may not be identical in size with the disk 18 but is disposed in the same horizontal plane with the latter disk. The disk 28 is driven in unison and in the same direction as the disk 18 through an intervening idler pinion 29 which is freely rotative about a stud 30 set into the bracket arm 25. Threaded into the disk 28 as instanced in Fig. 4, are radially or eccentrically arranged studs 31 which, like the die element 20 on the disk 18, are circumferentially spaced. Rotative about the studs 31 are contact or cam elements 32 which correspond in number to the die elements 20 on the disk 18 and which are adapted to cooperate with the said die elements in bending the rod or tube 22 in a manner presently explained. To each contact or cam element 32 is secured a spur pinion 35 which meshes with a somewhat larger gear wheel 36 freely rotative about another stud 37, see Fig. 3, set into the disk 28; and secured in turn to the gear wheel 36, is a small pinion 38 which meshes with a spur gear 39 keyed, as at 40, to the fixed shaft 26 already referred to. As best shown in Fig. 3, the shaft 26 is held in assembly by nuts 41 and 42 threadedly engaged on its opposite ends.

The work piece 22 to be bent is placed in the machine as shown in Fig. 2, i. e., one end thereof is inserted between the holding stud 21 on the disk 18 and the adjacent die element 20. A backing bar 43 is next placed against one side of the work piece 22 whereupon the machine is started. As the disks 18 and 28 rotate about the shafts 13 and 26, the contact or cam element 32 corresponding to the first of the die elements 20 is moved into contact with the backing bar 43 and, by its action upon said bar, the work piece 22 is bent about said die element after the manner shown in Figs. 2 and 5. As the action proceeds, the bent portion of the work piece 22 is turned as shown in Fig. 5, into engagement with the next die element 20 which immediately follows in the direction of rotation of the disk 18. During the bending, the contact or cam element 32 active at the time rotates independently about its axis and, due to its eccentric shape, is maintained in rolling contact with the backing bar 43. The machine may be stopped at this stage if but a single angle bend in the work piece is desired. On the other hand, if the machine is kept in operation, the work piece 22 will be bent eventually to rectangular configuration as in Fig. 6 by successive cooperation of corresponding pairs of die and contact or cam elements 20 and 32, the bending being completed by a single rotation of two disks 18 and 28. As will be readily understood, other than right angle bends can be made successively with my improved machine by providing a greater or lesser number of cooperative die and cam elements on the two disks 18 and 28, and the work pieces thereby fashioned to correspondingly different polygonal shapes.

In the embodiment of my invention illustrated in Figs. 7–10, the contact or cam element 32a is of somewhat different construction in that it comprises a plate 45 which is rotative about an eccentrically disposed stud 31a in the disk 28a, the pinion 35a secured to said plate as in Fig. 8 being, in this instance, in direct mesh with the fixed gear 39a on the stud 26a about which said disk rotates. Upstanding from the plate 45 are three studs 46 which are spaced and arranged at different radial distances from the axis of the stud 31a, and on which are mounted rollers 47 which are grooved circumferentially like the die element 20a on the disk 18a. In all other respects the construction of the alternative embodiment is similar to that of the first described embodiment. Therefore, in order to dispense with the necessity for repetitive description, all the other components not particularly referred to of the modification, but having their counterparts in the first described embodiment, are identified by the same reference numerals with the addition, in each instance, of the letter *a* for convenience of more ready distinction.

In preparation for the bending with the modified machine, one end of the work piece 22a is inserted between the stud 21a and the die element 20a on the disk 18a, as in Fig. 7, in the same manner as described in connection with the first embodiment. Upon starting the machine, contact or cam element 32a is independently rotated about the stud 31 in the direction of the arrow thereon as the disk 28a revolves, and its rollers 47 are successively moved into engagement directly with the work piece 22a, as shown in Figs. 9 and 10, to progressively bend said work piece about the cooperative die element 20a on the disk 18a. While I have shown but one pair of cooperative die and contact or cam elements in the alternative embodiment, it is to be understood several such pairs may be provided to adapt the modified machine for the formation, as in the machine of the first embodiment, of multiple bends in the work piece.

In the third embodiment of my invention illustrated in Figs. 11–25, a profile die element 20b of variant or compound curvature is secured, by fastening devices 19b, to the disk 18b for the bending of roof supporting ribs for railway cars or the bodies of automotive vehicles for example. At one end, the profile die element 20b, is formed with a suitable means 21b for holding or securing the work piece or bar 22b to be bent. For cooperation with the die element 20b, I have provided a plurality of contact or cam elements 32b which are generally like the cam element 32a of the last described embodiment, and which are secured respectively to short shafts 31b circumferentially arranged in spaced relation in the disk 28b, each such shaft being provided with a spur pinion 35b to mesh with the fixed spur wheel 39b. As in the previous embodiments, the toothed disks 18b and 28b are rotated in unison and in the same direction through an idler pinion 29b. It will be noted that the eccentrically-disposed rollers 47b may vary in number and in arrangement as between the several contactor cam elements 32b.

In preparation for the bending, the work piece 22b is secured to the cam element 20b by the means 21b, and the machine is then started to effect the bending. As the disks 18b and 28b are rotated through the successive positions of Figs. 12–25, the work piece 22b is progressively bent to the shape of the die element 20b by the cooperative action of the contact or cam elements 32b on the disk 28b with the die element 20b on the disk 18b in a manner which will be easily understood from the drawings.

My invention is not to be considered as limited to the precise details of construction and arrangement herein disclosed, since, through suitable further modifications within the scope of the broader of the appended claims, it can be adapted for the shaping rods, tubes, bars and plates to configurations other than those illustrated by way of example, as will be readily apparent.

Having thus described my invention, I claim:

1. In a bending machine, a rotary support; a die element eccentrically mounted on the support; a holding means on the support adjacent the die element for engaging one end of a work piece to be bent; a second identical rotary support coplanar with the first mentioned support; a rotary cam element eccentrically mounted on the second support to cooperate in the bending with the die element on the first mentioned support; means for rotating the two supports in the same direction and at the same speed; a stationary gear wheel coaxial with the second support; and a pinion carried by the second support and in mesh with the stationary gear through which the cam element is turned substantially through a complete revolution during the time of its cooperation with the die element on the first support.

2. A bending machine according to claim 1, wherein the die element and the cooperative cam element are complementally grooved to receive the work piece between them during the bending.

3. In a bending machine, a rotary disk having eccentrically mounted thereon a fixedly positioned die element and a stop projection adjacent the die element between which and said projection one end of a work piece to be bent is adapted to be engaged; a second identical rotary disk arranged in coplanar relation to the first disk having eccentrically mounted thereon, for independent rotation, a contact or cam element to cooperate with the die element on the first disk in bending the work piece about the last mentioned die element; means for positively driving the two disks in the same direction and at the same speed to bring the die element and the contact or cam element into cooperative relation during rotation of said disks; and means for positively rotating the contact or cam element through substantially a complete revolution during the time of its cooperation with the die element on the first mentioned disk, including a stationary gear wheel coaxial with the second disk and a pinion carried by the second disk and driven from the spur wheel.

4. A bending machine according to claim 3, wherein the first mentioned die element is circular in configuration and provided with a circumferential groove; and wherein the cooperative contact element is in the form of an eccentric cam.

5. A bending machine according to claim 3, wherein the two disks are in the form of flat spur gear wheels and are intermeshed respectively with an interposed spur pinion; and wherein one of the disks is power driven.

6. A bending machine according to claim 3, wherein the second mentioned disk rotates about a fixed axis; wherein the spur gear is secured to the fixed axis; wherein the cooperative contact or cam element is affixed, together with a spur pinion, to a shaft rotatively borne in the second mentioned disk; and wherein, through intermediate gears carried by the second mentioned disk, the spur pinion is driven from the gear wheel fast, as aforesaid, upon the fixed axis as the second mentioned disk revolves about said axis.

7. A bending machine according to claim 3, wherein the first mentioned disk is provided with several fixed die elements in uniformly spaced relation circumferentially; and wherein the second mentioned disk is provided with a like number of rotary contact or cam elements similarly spaced for the formation of multiple bends in the work piece.

8. A bending machine according to claim 3, wherein the first mentioned disk is provided with several fixed die elements in uniformly spaced relation circumferentially; wherein the second mentioned disk is provided with a like number of rotary contact or cam elements similarly spaced for the formation of multiple bends in the work piece; wherein the second mentioned disk rotates about a fixed axis; wherein a spur gear is secured to the fixed axis; wherein each cooperative contact or cam element is affixed, together with a spur pinion, to a shaft rotatively borne in the second mentioned disk; and wherein, through a group of intermediate gears carried by the second mentioned disk, each such spur pinion is driven from the gear wheel fast, as aforesaid, upon the fixed axis as the second mentioned disk revolves about said axis.

9. The invention according to claim 3, wherein the cooperative contact or cam element comprises a plate rotative about an eccentrically-disposed stud fixed in the second mentioned disk, and a group of rolls mounted in spaced relation upon the plate at different radial distances from the axis of rotation of said plate.

10. The invention according to claim 3, wherein the cooperative contact or cam element comprises a plate rotative about an eccentrically-disposed stud fixed in the second mentioned disk, and a group of rolls mounted in spaced relation upon the plate at different radial distances from the axis of rotation of said plate; wherein the second mentioned disk rotates about a fixed axis; wherein in spur gear is secured to the fixed axis; and wherein the plate of the contact or cam element is driven, through a spur pinion fastened thereto and in mesh with the gear wheel, as the second mentioned disk revolves about the fixed axis.

11. The invention, according to claim 1, wherein the die element, eccentrically mounted on the first support, has a profile surface of varying curvature wherewith the rotary cam element on the second support cooperates in the bending.

12. The invention, according to claim 1, wherein the die element, eccentrically mounted on the first support, has a profile surface of varying curvature; wherein there are plural contact or cam elements eccentrically mounted in uniformly spaced relation circumferentially of the second support to cooperate, in the bending, with the die element on the first support; and wherein the contact or cam elements are turned each through substantially a complete rotation during the time of cooperation with the die element on the first support, through individual pinions carried by the second support and meshing with the stationary gear wheel.

References Cited in the file of this patent

UNITED STATES PATENTS

| 586,661 | Holden | July 20, 1897 |
| 2,327,706 | Halstead | Aug. 24, 1943 |

FOREIGN PATENTS

| 29,113 | Great Britain | Dec. 9, 1897 |
| 457,101 | France | July 4, 1913 |
| 475,708 | Germany | May 1, 1929 |
| 53,707 | France | Mar. 25, 1946 |